Nov. 6, 1923.
J. B. KLEIN
1,472,915
WHEEL EXPANDER
Filed Sept. 23, 1922
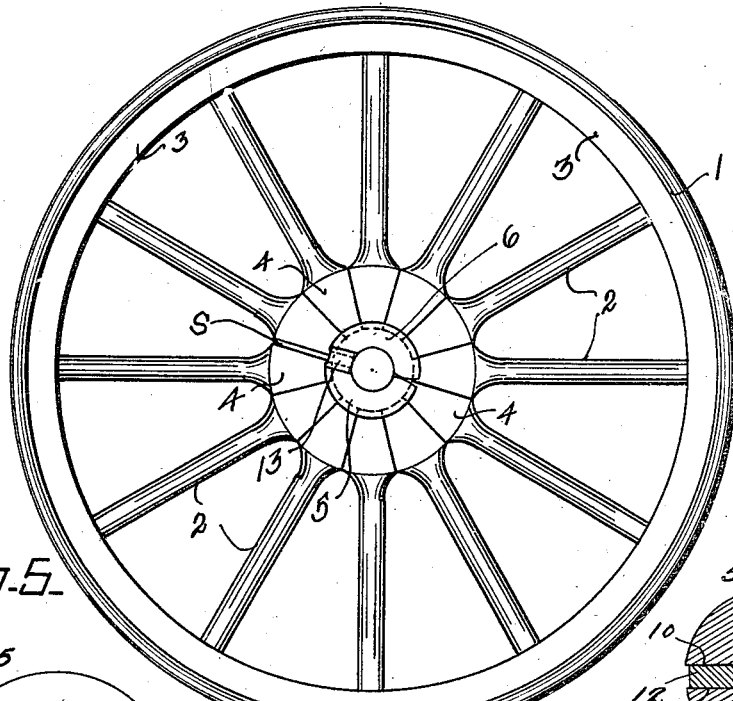
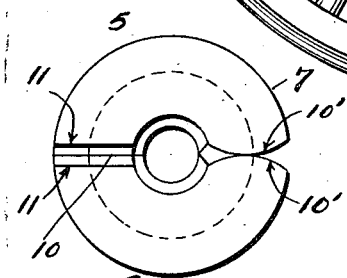
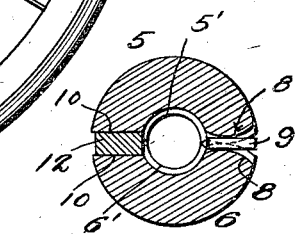
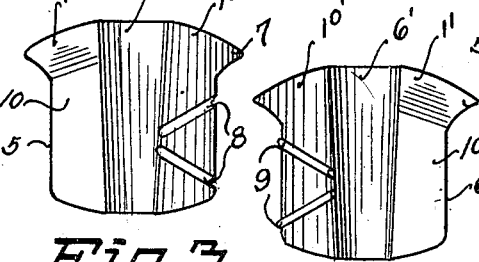
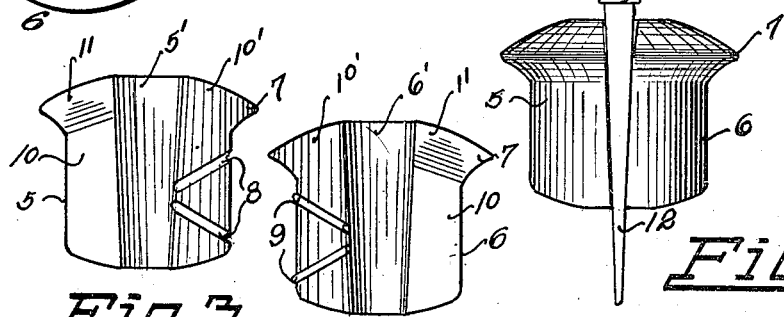
Inventor
Joseph B. Klein.
By Herbert E. Smith
Attorney Patented Nov. 6, 1923.

1,472,915

UNITED STATES PATENT OFFICE.

JOSEPH B. KLEIN, OF COLTON, WASHINGTON.

WHEEL EXPANDER.

Application filed September 23, 1922. Serial No. 590,037.

*To all whom it may concern:*

Be it known that I, JOSEPH B. KLEIN, a citizen of the United States, residing at Colton, in Whitman County and State of Washington, have invented certain new and useful Improvements in Wheel Expanders, of which the following is a specification.

The present invention relates to improvements in wheel expanders designed especially for use in connection with automotive wheels for the purpose of tightening the formation of the spoke-tenons about the hub portion of the wheel. The primary object of the invention is the provision of means expanding the structure formed by the radiating tenons of the spokes in order that filling pieces or plates may be inserted into the space or spaces between adjoining spoke tenons. The presence of these filler plates insures a close frictional contact between the tenons of the spokes, prevents relative movement of the spoke tenons, and eliminates squeaky noises usually accompanying a traveling wheel when the spoke-tenons are sufficiently loose to permit relative movement. The filler pieces thus used compensate for wear caused by friction between adjoining faces of spoke-tenons, and at the same time insure a rigid and firm formation about the hub of the wheel.

The invention consists essentially in certain novel combinations and arrangements of parts involving an expander and sectional hub-plug which is applied to the wheel for the above purpose, but is withdrawn therefrom after its purpose has been accomplished.

In the accompanying drawings I have illustrated one complete example of the physical embodiment of my invention, wherein the parts are combined and arranged according to the best mode I have thus far devised for the practical application of the principles of my invention.

Figure 1 is a view of a wheel, in side elevation, showing the device of my invention applied thereto, and illustrating its function.

Figure 2 is a view, enlarged, of the sectional expanding-plug and wedge shown in their relative positions.

Figures 3 and 4 are face views of the two sections of which the expanding plug is composed.

Figure 5 is a top plan view of the device, the wedge being omitted.

Figure 6 is a transverse sectional view of the device, showing the wedge in section.

In order that the purpose and function of the device of my invention may readily be understood, I have designated in Figure 1 a wheel of conventional form, having the usual or standard tire 1, radiating wood spokes 2 and a felly 3 in which the outer ends of the spokes are assembled. The wedge-shaped or tapered tenons 4 of the spokes are assembled in radiating formation about the hub portion of the wheel as is customary.

When the device of the invention is to be utilized the hub plates (not shown) of the wheel are removed, and the device is adapted to frictionally engage the inner ends of the spokes or the free faces of their tenons, and enlarge the circular opening within the tenons. For this purpose I utilize an expansible plug, preferably of metal, and of cylindrical shape complementary to the hub-opening within the spoke-tenons. The expansible plug is of two complementary parts or sections, indicated as 5 and 6, each section having an enlargement or flanged head 7 and the two flanged heads form a circular enlargement or bead about the plug. The plug is thus adapted for insertion into the hub opening in the spoke-tenons and the annular bead formed by the flanges 7 insures a stop or abutment for seating the plug in the opening, and may also be used to pry out the plug from the opening after the device has been used.

The plug sections are preferably grooved longitudinally as at 5' and 6' and these complementary grooves form a tapered bore through the plug for the admission of a tool or expander if desired.

To hold the two sections against relative movement while the plug is in use, I utilize pairs of complementary angularly disposed grooves 8 in adjoining faces of the plug sections, and when the sections are assembled these grooves form sockets for the reception of pins 9 forced therein. The pins thus utilized hold the sections together against relative longitudinal movement, but permit an expanding movement or enlargement of the periphery of the plug. The plug sections are fashioned with complementary smooth faces 10, 10, which terminate in beveled faces 11, 11, and these latter faces, when the sections are assembled form a V-shape pocket at the headed end of the plug. The adjoining faces 10' of the plug sections, in which the grooves 8 are located are disposed in an angular plane one to another. Or these faces curved and adapted to rock on each other, to compensate for the entrance of the wedge 12 as the wedge forces its way through the plug between the faces 10.

The wedge 12 is preferably of metal and provided with a head 13 to receive hammer blows, and is used to expand the plug, which in turn spreads the spoke tenons of the wheel.

In use, after the hub-plates of the wheel have been removed, the two sections of the plug are assembled and the pins 9 inserted in their sockets, after which the assembled plug is seated in the hub opening within the spoke-tenon formation, with the ring 7 of the plug resting on the top plane of the spoke-tenons.

The narrow edge of the wedge, or its tip end is then inserted in the pocket formed by the two beveled faces 11 of the plug sections. By means of hammer blows on the head 13, the wedge is driven through the pocket and between the faces 10 of the two sections, thus spreading the plug. The two faces 10' roll in close frictional contact by reason of the entrance of the wedge in the opening between the two faces 10 and to compensate for the presence of the wedge. As the expansible plug is expanded the periphery of the plug uniformly engages the ends of the spoke tenons to gradually move the spokes, thus providing a space as S radially extending from the wedge and betwen adjoining tenons. While the plug is still in position a filler piece is forced into the space S to close the gap or space. The wedge may now be backed out of the plug and the latter turned so that the faces 10 of the plug will aline with the next tenon-joint, after which the plug is again expanded by the insertion of the wedge, and succeeding filler pieces inserted in this manner until the joints between the tenons are tightly filled. After all possible spaces have been filled the device is withdrawn and the hub plates may be put in place with the wheel ready for use.

Having thus fully described my invention, what I claim as new and desire to secure by Letters Patent is:—

1. The combination with a pair of plug sections having adjoining plane faces terminating in beveled ends to form a wedge-shaped pocket, of means for holding said sections against relative longitudinal movement, and said sections having oppositely rounded complementary faces to compensate for the entrance of a wedge between said plane faces.

2. An expansible hub-plug comprising a pair of sections, means for preventing relative longitudinal movement of said sections, said plug having diametrically arranged divisions between sections and a pocket at one division for the entrance of a wedge and said sections at the opposite division having rounded faces to permit movement of the sections to compensate for the entrance of a wedge, as described.

3. The combination with an expansible hub-plug comprising a pair of sections having adjoining plane faces and beveled ends to said faces forming a pocket, said sections also having a pair of complementary oppositely-rounded faces and formed with complementary grooves, a pin in said grooves, and a wedge adapted to coact with said sections as described.

In testimony whereof I affix my signature.

JOSEPH B. KLEIN.